US010801751B2

(12) United States Patent
Shaffer

(10) Patent No.: US 10,801,751 B2
(45) Date of Patent: Oct. 13, 2020

(54) WATER CONSUMING APPLIANCE AND A METHOD FOR OPERATING THE SAME

(71) Applicant: Haier US Appliance Solutions, Inc., Wilmington, DE (US)

(72) Inventor: Ryan Joseph Shaffer, Tipp City, OH (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 652 days.

(21) Appl. No.: 15/331,963

(22) Filed: Oct. 24, 2016

(65) Prior Publication Data
US 2018/0112785 A1    Apr. 26, 2018

(51) Int. Cl.
*E03B 7/07* (2006.01)
*F24H 9/20* (2006.01)
(Continued)

(52) U.S. Cl.
CPC ........... *F24H 9/2007* (2013.01); *E03B 7/071* (2013.01); *F17D 5/02* (2013.01); *F24D 19/1051* (2013.01);
(Continued)

(58) Field of Classification Search
CPC ......... Y10T 137/7306; Y10T 137/0452; Y10T 137/7727; Y10T 137/86389; Y10T 137/7761; Y10T 137/8342; F24H 9/2007; E03B 7/071; E03B 7/075; F17D 5/02; F17D 5/04; F17D 5/06; F24D 19/1051; F24D 2200/04; F24D 2200/08;
(Continued)

(56) References Cited

U.S. PATENT DOCUMENTS 3,874,403 A * 4/1975 Fischer ................. D06F 39/081
  137/386
5,161,563 A * 11/1992 Thompson .............. E03B 7/071
  137/1
(Continued)

FOREIGN PATENT DOCUMENTS

JP    2009192121 A    8/2009

OTHER PUBLICATIONS

The Rialco Flood Alarm, "Features of the Rialco Flood Alarm", Rialco, Inc.[retreived on Jan. 21, 2020] Retrieved from the Internet <URL:http:www.Rialco.com> (Year: 2020).*
(Continued)

*Primary Examiner* — Craig J Price
(74) *Attorney, Agent, or Firm* — Dority & Manning, P.A.

(57) ABSTRACT

A system and method of operating a water supply system with one or more water consuming appliances is provided. The water supply system includes a hot water heater for supplying a flow of heated water through a supply conduit to at least one water consuming appliance. The water consuming appliance receives the flow of heated water and provides an indication of a fault condition if excessive water accumulates in the appliance, which might indicate a malfunction with a drain pump or a water supply valve. A safety shutoff valve is positioned on the supply conduit and is in operative communication with the water consuming appliance. The safety shutoff valve is configured for stopping the flow of heated water when it receives the indication of the fault condition.

18 Claims, 4 Drawing Sheets

(51) Int. Cl.
*F24D 19/10* (2006.01)
*F17D 5/02* (2006.01)

(52) U.S. Cl.
CPC ...... *F24D 2200/04* (2013.01); *F24D 2200/08* (2013.01); *F24D 2220/08* (2013.01); *Y10T 137/0452* (2015.04); *Y10T 137/7306* (2015.04); *Y10T 137/7727* (2015.04); *Y10T 137/7761* (2015.04); *Y10T 137/8342* (2015.04)

(58) Field of Classification Search
CPC ........... F24D 19/10–1081; G05B 15/02; A47L 15/421; A47L 15/4212; G01M 3/2807; G01M 3/2815; G05D 7/00–0694
USPC ..... 137/392, 15.11, 460, 487.5, 558, 624.11, 137/624.12; 73/46, 195; 702/45, 46, 702/100; 340/870.02, 605, 606
See application file for complete search history.

(56) References Cited

U.S. PATENT DOCUMENTS

| | | | | |
|---|---|---|---|---|
| 5,240,022 | A * | 8/1993 | Franklin | F16K 5/0647 137/1 |
| 5,655,561 | A * | 8/1997 | Wendel | G01F 23/243 137/79 |
| 6,025,788 | A * | 2/2000 | Diduck | G01M 3/18 340/3.4 |
| 6,079,526 | A * | 6/2000 | Nezu | F16F 9/46 188/266.6 |
| 6,186,162 | B1 * | 2/2001 | Purvis | D06F 39/081 122/504.2 |
| 6,389,852 | B1 * | 5/2002 | Montgomery | A47L 15/421 137/312 |
| 6,552,647 | B1 * | 4/2003 | Thiessen | G05B 15/02 122/448.1 |
| 6,675,826 | B1 * | 1/2004 | Newman | F16K 31/082 122/504.2 |
| 7,082,959 | B1 * | 8/2006 | Franklin | F16K 17/383 137/312 |
| 7,574,896 | B1 * | 8/2009 | Cooper | G01M 3/2815 73/40.5 R |
| 7,900,647 | B2 | 3/2011 | Tornay | |
| 8,606,413 | B2 * | 12/2013 | Picton | E03B 7/071 700/282 |
| 8,922,379 | B1 * | 12/2014 | Meyer | G08B 21/20 340/521 |
| 9,019,120 | B2 | 4/2015 | Broniak et al. | |
| 9,513,019 | B2 * | 12/2016 | Acker | F24D 19/1063 |
| 10,215,424 | B2 * | 2/2019 | Acker | F24D 19/1063 |
| 10,466,727 | B2 * | 11/2019 | Shaffer | G05D 11/16 |
| 10,642,289 | B1 * | 5/2020 | Reeder | G05D 23/1366 |
| 2001/0054965 | A1 * | 12/2001 | Blum | G08B 21/20 340/605 |
| 2002/0033759 | A1 * | 3/2002 | Morello | G01M 3/18 340/605 |
| 2003/0024578 | A1 * | 2/2003 | Segal | E03B 7/071 137/613 |
| 2008/0179962 | A1 * | 7/2008 | Wood | G01M 3/16 307/98 |
| 2008/0252471 | A1 * | 10/2008 | Ford | G08B 21/20 340/605 |
| 2009/0235992 | A1 * | 9/2009 | Armstrong | G01M 3/2807 137/487.5 |
| 2009/0284382 | A1 * | 11/2009 | Hill | G01M 3/045 340/604 |
| 2010/0065126 | A1 * | 3/2010 | Segal | E03B 7/071 137/1 |
| 2010/0313958 | A1 * | 12/2010 | Patel | G01M 3/2815 137/1 |
| 2012/0024968 | A1 * | 2/2012 | Beyerle | G05D 23/1346 236/12.11 |
| 2014/0230925 | A1 * | 8/2014 | Halimi | G05D 16/20 137/487.5 |
| 2014/0261749 | A1 * | 9/2014 | Chen | E03C 1/057 137/78.1 |
| 2016/0376773 | A1 * | 12/2016 | Abuhamdeh | E03B 7/071 137/870 |
| 2017/0009432 | A1 * | 1/2017 | Lapointe | E03B 7/071 |
| 2017/0131174 | A1 * | 5/2017 | Enev | E03B 7/07 |
| 2018/0127957 | A1 * | 5/2018 | Enev | G01M 3/2815 |

OTHER PUBLICATIONS

The Rialco Flood Alarm, "Prevent water damage", Rialco, Inc. [retreived on Jan. 21, 2020] Retrieved from the Internet <URL:http:www.Rialco.com> (Year: 2020).*

* cited by examiner

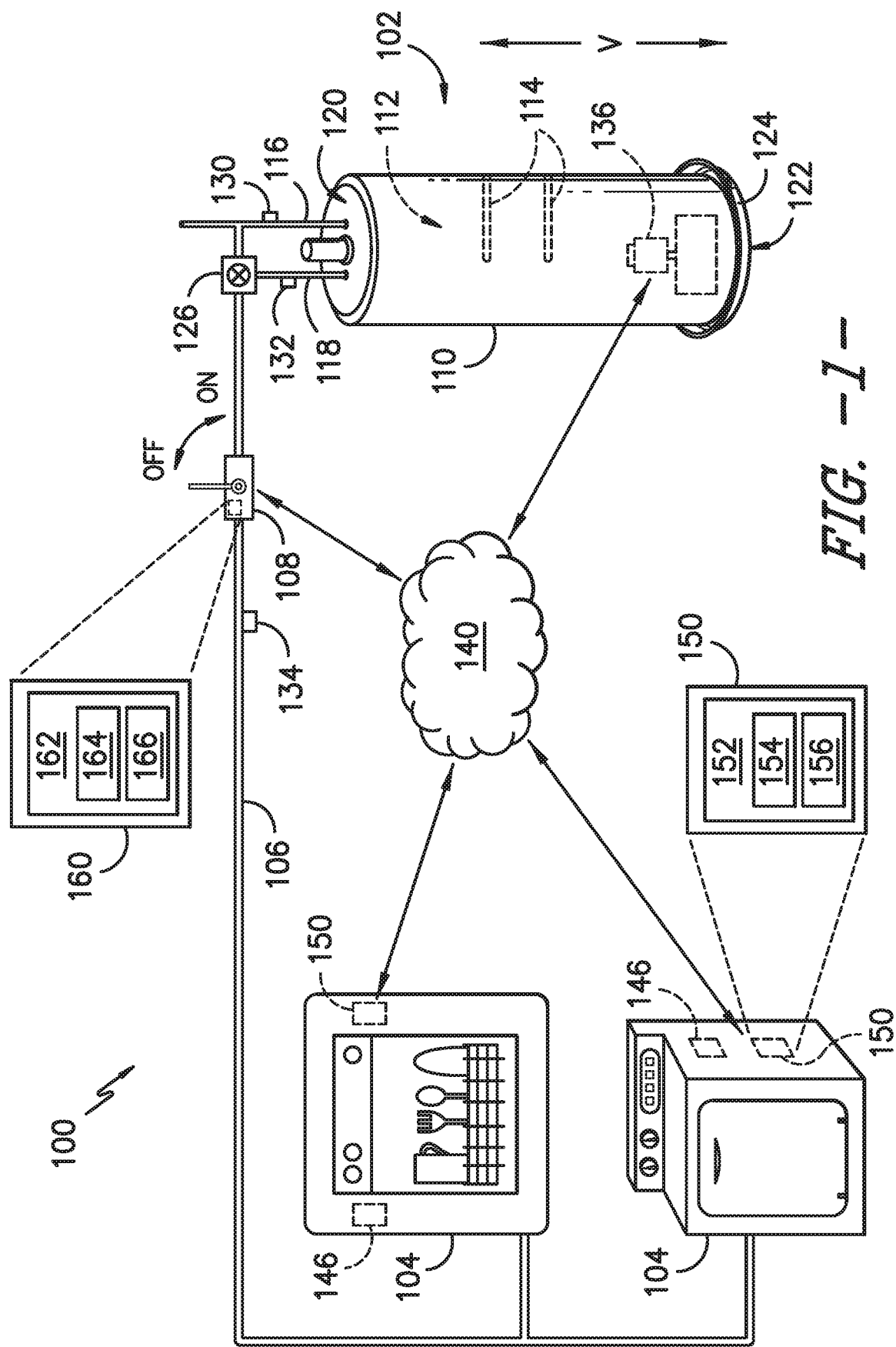
FIG. -1-

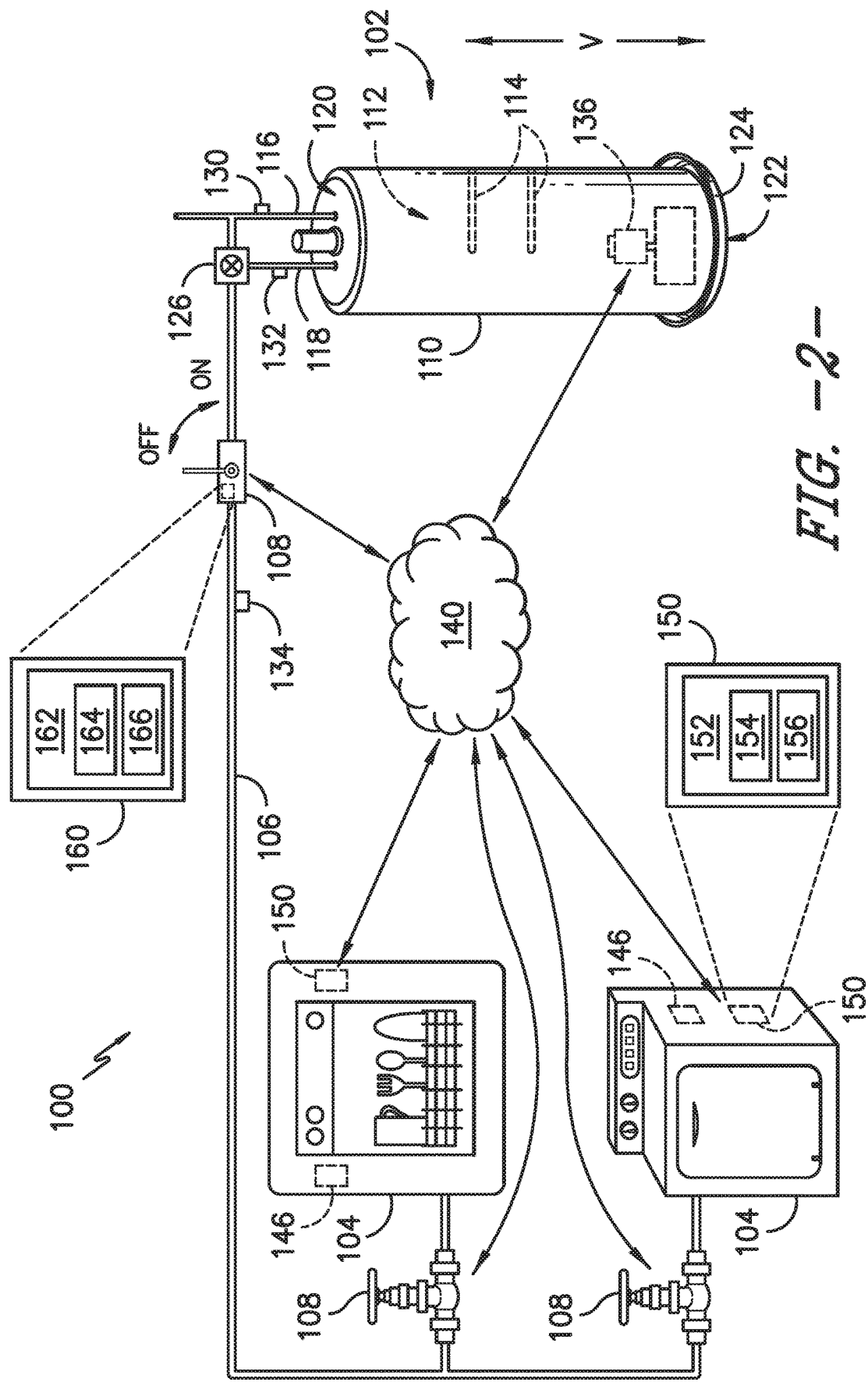
FIG. -2-

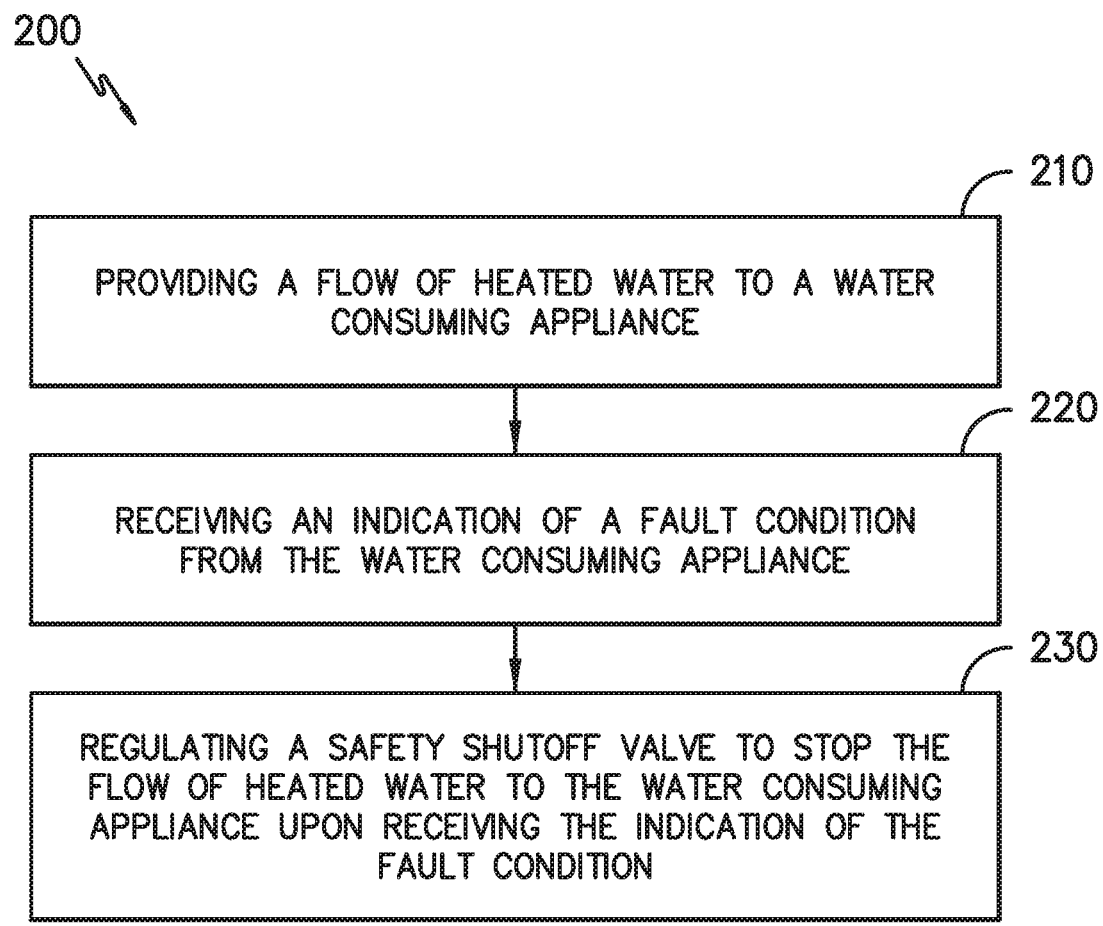
FIG. -3-

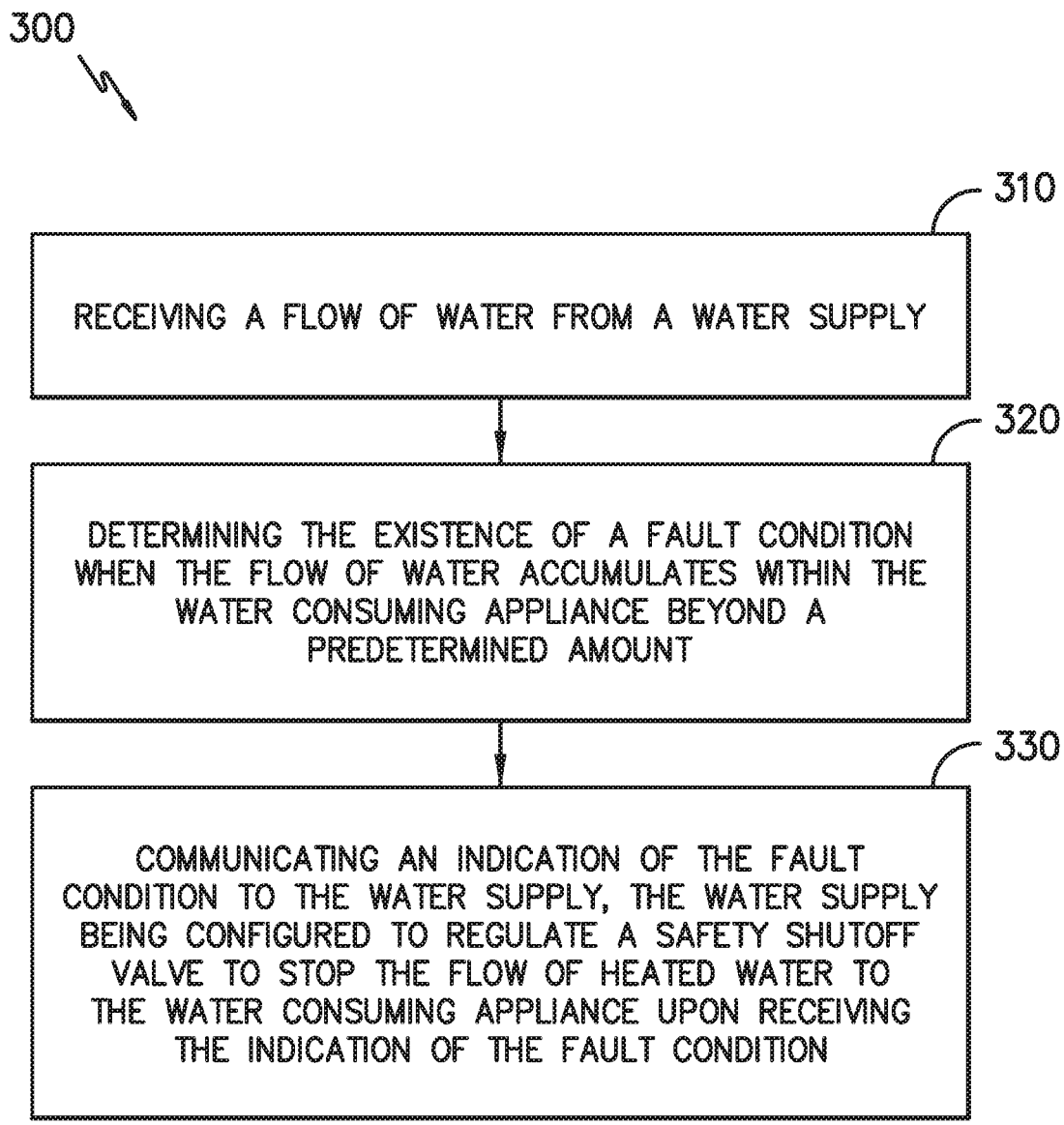
FIG. -4-

WATER CONSUMING APPLIANCE AND A METHOD FOR OPERATING THE SAME

FIELD OF THE INVENTION

The present subject matter relates generally to water heater appliances and water consuming appliances, and more particularly to methods for controlling the flow of water from water heater appliances in the event of a fault condition with one or more of the water consuming appliances.

BACKGROUND OF THE INVENTION

Certain water heater appliances include a tank therein. Heating elements, such as gas burners, electric resistance elements, or induction elements, heat water within the tank during operation of such water heater appliances. During operation, relatively cold water flows into the tank, and the heating elements operate to heat such water to a predetermined temperature. In particular, the heating elements generally heat water within the tank to a very high temperature. A mixing valve may be used to mix the relatively hot water with relatively cold water in order to bring the temperature of such water down to suitable and/or more usable temperatures. The heated water may then be supplied to one or more water consuming appliances through a supply conduit.

Certain water consuming appliances have water inlet valves that are configured to control the amount of heated water entering the water consuming appliance. Similarly, certain water consuming appliances include drain pumps which are intended to pump water out of the water consuming appliance, e.g., between operating cycles. However, sometimes water inlet valves fail and may remain in the open position, and drain pumps may also fail to operate properly and discharge the desired amount of water between cycles. Such fault conditions may result in excessive amounts of water accumulating within the water consuming appliance, which can lead to leaking or flooding situations.

Accordingly, a water consuming appliance with features for preventing the accumulation of excessive amounts of water when fault conditions occur would be useful. More specifically, a system including a water heater appliance and water consuming appliance having features for stopping the flow of water when potential flooding conditions are occurring would be particularly beneficial.

BRIEF DESCRIPTION OF THE INVENTION

The present subject matter provides a water supply system for use with one or more water consuming appliances. The water supply system includes a hot water heater for supplying a flow of heated water through a supply conduit to at least one water consuming appliance. The water consuming appliance receives the flow of heated water and provides an indication of a fault condition if excessive water accumulates in the appliance, which might indicate a drain pump or water supply valve malfunction. A safety shutoff valve is positioned on the supply conduit and is in operative communication with the water consuming appliance. The safety shutoff valve is configured for stopping the flow of heated water when it receives the indication of the fault condition. Additional aspects and advantages of the invention will be set forth in part in the following description, or may be apparent from the description, or may be learned through practice of the invention.

In one exemplary embodiment, a water supply system is providing. The water supply system includes a hot water heater configured for heating cold water from a water supply and discharging a flow of heated water through a supply conduit. A water consuming appliance is configured for receiving the flow of heated water from the hot water heater through the supply conduit, the water consuming appliance including an appliance communication module. A safety shutoff valve is positioned on the supply conduit and is in operative communication with the appliance communication module, the safety shutoff valve being configured to stop the flow of heated water when the appliance communication module provides an indication of a fault condition.

In another exemplary embodiment, a method for operating a hot water heater system is provided. The method includes providing a flow of heated water to a water consuming appliance, receiving an indication of a fault condition from the water consuming appliance, and regulating a safety shutoff valve to stop the flow of heated water to the water consuming appliance upon receiving the indication of the fault condition.

In yet another exemplary embodiment, a method of operating a water consuming appliance is provided. The method includes receiving a flow of water from a water supply and determining the existence of a fault condition when the flow of water accumulates within the water consuming appliance beyond a predetermined amount. The method further includes communicating an indication of the fault condition to the water supply, the water supply being configured regulate a safety shutoff valve to stop the flow of heated water to the water consuming appliance upon receiving the indication of the fault condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of certain components of a water heater system including a water heater appliance and water consuming devices according to an exemplary embodiment of the present subject matter.

FIG. 2 provides a schematic view of certain components of a water heater system including a water heater appliance and water consuming devices according to another exemplary embodiment of the present subject matter.

FIG. 3 illustrates a method for operating a hot water heater to prevent leaks during a fault condition according to an exemplary embodiment of the present subject matter.

FIG. 4 illustrates a method for operating a water consuming device to prevent leaks during a fault condition according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a hot water heater system 100 according to an exemplary embodiment of the present subject matter. As illustrated, hot water heater system 100 generally includes a water heater appliance 102 and one or more water consuming appliances 104. Water heater appliance 102 is placed in fluid communication with the one or more water consuming appliances by a supply conduit 106. In addition, hot water heater system 100 includes a safety shutoff valve 108 that is operatively coupled to supply conduit 106 and is configured for regulating a flow of water passing from water heater appliance 102 to water consuming appliance 104 through supply conduit 106. Each of these components, as well as methods of operating hot water heater system 100, will be described below in detail.

As illustrated and discussed herein, water heater appliance 102 is a conventional electric or gas water heater with a storage tank for storing heated water. However, it should be appreciated that according to alternative embodiments, any other suitable water heating appliance may be used while remaining within the scope of the present subject matter. For example, tankless water heaters, hybrid heat pump water heaters, and solar water heaters could be used instead of the storage tank water heater illustrated in the figures. Indeed, aspects of the present subject matter may be applied for controlling any water supply, heated or not, that is providing a supply of water to a water consuming appliance.

Similarly, as illustrated in the figures, water consuming appliances 104 are a dishwashing appliance and a clothes washing appliance. However, it should be appreciated that according to alternative embodiments, any other suitable water consuming appliance, such as a refrigerator or ice maker, may be used while remaining within the scope of the present subject matter. In addition, supply conduit 106 is illustrated as a single pipe that splits at a junction to deliver heated water to the dishwashing appliance and the clothes washing appliance. However, according to alternative embodiments, more than one supply conduit may be used for providing cold water, hot water, or any other fluid to water consuming appliances 104. The hot water heater system 100 illustrated in the figures is used only for the purpose of explaining aspects of the present subject matter and is not intended to limit the scope of the invention in any manner.

Referring now to FIGS. 1 and 2, water heater appliance 102 will be described. Water heater appliance 102 includes a casing 110. Inside casing 110, water heater appliance 102 includes a storage tank 112 configured for storing water. Heating elements 114 are positioned inside and/or around storage tank 112 for heating water stored therein. Heating elements 114 may include a gas burner, a heat pump, an electric resistance element, a microwave element, an induction element, a sealed heat pump system or any other suitable heating element or combination thereof. It should be understood that as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 102 also includes a cold water conduit 116 and a hot water conduit 118 that are both in fluid communication with storage tank 112. As an example, cold water from a water source, e.g., a municipal water supply or a well, can enter water heater appliance 102 through cold water conduit 116. From cold water conduit 116, such cold water can enter storage tank 112 wherein it is heated with heating elements 114 to generate heated water. Such heated water can exit water heater appliance 102 at hot water conduit 118 and, e.g., be supplied to a bath, shower, sink, or any other suitable feature.

Water heater appliance 102 extends longitudinally between a top portion 120 and a bottom portion 122 along a vertical direction V. Thus, water heater appliance 102 is generally vertically oriented. Water heater appliance 102 can be leveled, e.g., such that casing 110 is plumb in the vertical direction V, in order to facilitate proper operation of water heater appliance 102. A drain pan 124 is positioned at bottom portion 122 of water heater appliance 102 such that water heater appliance 102 sits on drain pan 124. Drain pan 124 sits beneath water heater appliance 102 along the vertical direction V, e.g., to collect water that leaks from water heater appliance 102 or water that condenses on an evaporator of water heater appliance 102. It should be understood that water heater appliance 102 is provided by way of example only and that the present subject matter may be used with any suitable water heater appliance.

As illustrated, water heater appliance 102 may further include a mixing valve 126 that is in fluid communication with cold water conduit 116, hot water conduit 118, and supply conduit 106. Mixing valve 126 is configured for selectively directing water from cold water conduit 116 and hot water conduit 118 into supply conduit 106 in order to regulate a temperature of water within supply conduit 106. In this regard, mixing valve 126, for example, may be an electronic mixing valve and may be infinitely adjustable in order to permit fine-tuning of the temperature of water within supply conduit 106.

According to the illustrated exemplary embodiment, water heater appliance 102 also includes a cold water conduit flow detector or first temperature sensor 130, a hot water conduit flow detector or second temperature sensor 132, and a supply conduit flow detector or third temperature sensor 134. First temperature sensor 130 is positioned on or proximate cold water conduit 116, second temperature sensor 132 is positioned on or proximate hot water conduit 118, and third temperature sensor 134 is positioned on or proximate supply conduit 106 for measuring the temperature of water within the respective conduits.

Water heater appliance 102 further includes a controller 136 that is configured for regulating operation of water heater appliance 102. Controller 136 is in, e.g., operative communication with heating elements 114, mixing valve 126, and temperature sensors 130, 132, and 134. Thus, controller 136 can selectively activate heating elements 114 in order to heat water within storage tank 112. Similarly, controller 136 can selectively operate mixing valve 126 in order to adjust a position of mixing valve 126 and regulate a temperature of water within supply conduit 106.

Controller 136 includes memory and one or more processing devices such as microprocessors, CPUs or the like, such as general or special purpose microprocessors operable to execute programming instructions or micro-control code associated with operation of water heater appliance 102. The memory can represent random access memory such as DRAM, or read only memory such as ROM or FLASH. The processor executes programming instructions stored in the memory. The memory can be a separate component from the processor or can be included onboard within the processor. Alternatively, controller 136 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 136 can be positioned at a variety of locations. In the exemplary embodiment shown in FIG. 1, controller 136 is positioned within water heater appliance 102, e.g., as an integral component of water heater appliance 102. In alternative exemplary embodiments, controller 136 may positioned away from water heater appliance 102 and communicate with water heater appliance 102 over a wireless connection or any other suitable connection, such as a wired connection.

As mentioned above, controller 136 can operate heating elements 114 to heat water within storage tank 112. As an example, a user can select or establish a set-point temperature for water within storage tank 112, the set-point temperature may be a default value, or the set-point temperature may be any other suitable temperature set by any other suitable means. As an example, the set-point temperature may be between about one hundred and forty degrees Fahrenheit and about one hundred and eighty-degrees Fahrenheit. Based upon the set-point temperature, controller 136 can selectively activate heating elements 114 in order to heat water within storage tank 112 to the set-point temperature.

Controller 136 can also operate mixing valve 126 to regulate the temperature of water within supply conduit 106. For example, controller 136 can adjust the position of mixing valve 126 in order to regulate the temperature of water within supply conduit 106. As an example, a user can select or establish a predetermined temperature or a set-point temperature of mixing valve 126, or the set-point temperature of mixing valve 126 may be a default value. For example, the set-point temperature of mixing valve 126 may be between about one hundred degrees Fahrenheit and about one hundred and twenty degrees Fahrenheit. Based upon the set-point temperature of mixing valve 126, controller 136 can adjust the position of mixing valve 126 in order to change or tweak a ratio of relatively cool water flowing into supply conduit 106 from cold water conduit 116 and relatively hot water flowing into supply conduit 106 from hot water conduit 118. In such a manner, mixing valve 126 can utilize water from cold water conduit 116 and hot water conduit 118 to regulate the temperature of water within supply conduit 106, e.g., to discharge a flow of heated water through supply conduit 106.

Referring still to FIGS. 1 and 2, according to an exemplary embodiment of the present subject matter, supply conduit 106 may be in fluid communication with a two water consuming devices 104. More specifically, water consuming devices 104 may be configured to selectively draw water from supply conduit 106 as needed for operation. As used herein, "water consuming device" may refer to any suitable plumbing fixture, household appliance, or any other suitable device configured to draw water from water heater appliance 102. Moreover, water heater appliance 102 may be configured to supply one or more than two water consuming devices or fixtures, and may use any suitable number of supply conduits, according to alternative embodiments.

According to an exemplary embodiment, water consuming devices 104 may be smart appliances that are capable of communication with external devices via a wired or wireless connection. For example, water consuming devices 104 may be communicatively coupled to controller 136 and/or safety shutoff valve 108, as described in more detail below. For example, as illustrated in FIGS. 1 and 2, water consuming devices 104 are connected to water heater appliance 102 through a network 140. Network 140 can be any type of communication network. For example, network 140 can include one or more of a wireless network, a wired network, a personal area network, a local area network, a wide area network, the internet, etc. According to an exemplary embodiment, water consuming devices 140 may communicate with water heater appliance 102 over network 140, such as the internet, to send and/or receive status information, operating information, or an indication of a fault condition, as described below.

As used herein, "fault condition" is intended to refer to any condition or malfunction in water consuming appliances 104 which results in the accumulation of an excessive amount of water within the water consuming appliance 104. For example, a fault condition may refer to a leak event, an overflow condition, or a valve being stuck in the open position in water consuming appliance 104. Such a fault condition may be detected by water consuming appliance 104, for example, by one or more fault detection devices 146. The fault detection device 146 may be any suitable device for detecting a fault condition and providing an indication of that fault condition, e.g., to safety shutoff valve 108, as described below. For example, the fault detections device 146 may be a flood float, a pressure switch, a magnetic reed switch, or any other suitable device.

To establish communications with network 140, each of water consuming devices 104 includes, for example, a controller 150. Various components of exemplary controller 150 are illustrated in schematic fashion in FIGS. 1 and 2. As shown, controller 150 may include one or more processor(s) 152 and associated memory device(s) 154 configured to perform a variety of computer-implemented functions (e.g., performing the methods, steps, and the like disclosed herein). By way of example, processor 152 may include one or more microprocessors, such as general or special purpose microprocessors operable to execute programming instructions or micro-control code associated with an operating cycle. Memory 154 may represent random access memory such as DRAM, or read only memory such as ROM or FLASH. In one embodiment, processor 152 executes programming instructions stored in memory 154. Memory 154 may be a separate component from processor 152 or may be included onboard within processor 152.

Additionally, controller 150 may also include a communications module 156 to facilitate communications between controller 150 and controller 136 of water heater appliance 102 (or other networked devices). For instance, the communications module 156 may serve as an interface to permit controller 150 to transmit and/or receive an indication of a fault condition, such as a leak, a stuck open valve, or other fault condition. According to some exemplary embodiments, communications module 156 may also include an interface (e.g., one or more analog-to-digital converters) to permit input signals to be converted into signals that can be understood and processed by the processor 152.

As illustrated in FIGS. 1 and 2, safety shutoff valve 108 is positioned on supply conduit 106 and is configured for regulating the flow of water through supply conduit. More specifically, as described below, safety shutoff valve 108 may be configured to stop the flow of heated water when the water consuming appliance 104 is experiencing a fault condition. Although illustrated as a standalone valve, it should be appreciated that safety shutoff valve 108 may be a part of water heater appliance 102, may be positioned at any suitable location along supply conduit 106, or may be positioned adjacent to or may be a part of water consuming devices 104. Moreover, hot water heater system 100 may include multiple safety shutoff valves 108. For example, as illustrated in FIG. 2, hot water heater system 100 includes a dedicated, redundant safety shutoff valve 108 for each of water consuming appliances 104.

Notably, safety shutoff valve 108 may also include a controller 160 for communicating with water consuming appliances 104, e.g., via controllers 150, or with other devices connected to network 140. More specifically, various components of exemplary controller 160 are illustrated in schematic fashion in FIGS. 1 and 2. As shown, controller 160 may include one or more processor(s) 162 and associated memory device(s) 164 configured to perform a variety of computer-implemented functions (e.g., performing the methods, steps, and the like disclosed herein). By way of example, processor 162 may include one or more microprocessors, such as general or special purpose microprocessors operable to execute programming instructions or micro-control code associated with an operating cycle. Memory 164 may represent random access memory such as DRAM, or read only memory such as ROM or FLASH. In one embodiment, processor 162 executes programming instructions stored in memory 164. Memory 164 may be a separate component from processor 162 or may be included onboard within processor 162.

Additionally, controller 160 may also include a communications module 166 to facilitate communications between and among controllers connected to network 140, e.g., controllers 136 and 150, or other networked devices. For instance, the communications module 166 may serve as an interface to permit controller 160 to transmit and/or receive an indication of a fault condition, such as a leak, a stuck open valve, an overflow, or other fault condition of water consuming appliances 104. According to some exemplary embodiments, communications module 166 may also include an interface (e.g., one or more analog-to-digital converters) to permit input signals to be converted into signals that can be understood and processed by the processor 162.

Now that the construction and configuration of hot water heater system 100 according to an exemplary embodiment of the present subject matter has been presented, an exemplary method 200 for operating a hot water heater system according to an exemplary embodiment of the present subject matter is provided. In addition, an exemplary method 300 for operating a water consuming appliance according to an exemplary embodiment of the present subject matter is provided. Methods 200, 300 can be used to operate any suitable hot water heater system or water consuming appliance. For example, method 200 may be utilized to operate hot water heater system 100 (FIGS. 1 and 2) and method 300 may be utilized to operate water consuming appliance 104 to prevent leaks and overflow conditions. In this regard, for example, controllers 136, 150, and 160 may be either collectively or individually programmed to implement methods 200, 300.

In general, method 200 may be used to stop the flow of heated water when the appliance provides an indication of a fault condition, e.g., via an appliance controller. Method 200 includes, at step 210, providing a flow of heated water to a water consuming appliance. For example, water heater appliance 102 may provide a flow of water to water consuming appliance 104 through supply conduit 106. Notably, as described above, certain conditions within water consuming appliance 104 may cause water to accumulate beyond the capacity of water consuming appliance 104. These conditions, referred to herein as fault conditions, may be due to a water supply valve being stuck in the open position, such that water is constantly supplied to water consuming appliance 104. After the water reaches a predetermined level, water consuming appliance 104 may transmit an indication of the fault condition.

Thus, method 200 further includes at step 220, receiving an indication of a fault condition from the water consuming appliance. Method 200 may further include, at step 230 regulating a safety shutoff valve to stop the flow of heated water to the water consuming appliance upon receiving the indication of the fault condition. In this manner, for example, safety shutoff valve 108 may close supply conduit 106 such that water does not continue to flow to water consuming appliance 104.

According to alternative embodiments, method 200 may further include sending a notification of the indication of the fault condition to a user of the water consuming appliance. In this manner, a user may take corrective action to rectify the fault condition. For example, if the fault condition is due to a stuck open valve, the user may replace or repair the valve. If the fault condition is due to a malfunctioning drain pump, the user may repair or replace the drain pump, etc. According to another embodiment, the notification includes an instruction to the user of the water consuming appliance to implement such corrective actions to resolve the fault condition. In addition, according to exemplary embodiments, safety shutoff valve 108 may be configured to remain closed until safety shutoff valve 108 or water heater appliance 102 receives an error reset indication, at which time the flow of heated water may be resupplied to water consuming appliance 104.

In general, method 300 may also be used to stop the flow of heated water when a water consuming appliance provides an indication of a fault condition, e.g., via an appliance controller. Method 300 includes, at step 310, receiving a flow of water from a water supply. For example, heated water may be received by water consuming appliance 104 from hot water heater 102. Step 220 includes determining the existence of a fault condition when the flow of water accumulates within the water consuming appliance beyond a predetermined amount. For example, if water consuming appliance 104 is a dishwasher, the predetermined amount may be the amount of water required to fill the entire sump space of the dishwasher.

Method 300 further includes, at step 330 communicating an indication of the fault condition to the water supply, the water supply being configured regulate a safety shutoff valve to stop the flow of heated water to the water consuming appliance upon receiving the indication of the fault condition. For example, water consuming appliance 104 provides an indication of the fault condition to safety shutoff valve 108, which is configured to stop the flow of heated water as described above to prevent an overflow in the appliance.

After the flow of water has been stopped, a drain cycle may be operated to remove the accumulated water within the water consuming appliance. After the water has been drained from the appliance, water may be resupplied. If another indication of a fault condition is received, safety shutoff valve may stop again and prevent water from being resupplied until an error reset is received, e.g., by a user or technician after the underlying issue has been resolved. In this regard, according to an exemplary embodiment, if a fault condition arises during a single operating cycle but does not occur again, this may be due to a nuisance trip, e.g., such as a wave action in a dishwasher, but may not be indicative of a true malfunction or issue. If, however, multiple fault conditions occur in succession, it is likely that a malfunction device needs to be repaired for proper operation. In such a situation, the safety shutoff valve 108 remains in the closed position until the problem is fixed and an error reset is received.

Safety shutoff valve 108 is described above as being configured for stopping the flow of water in certain circumstances. However, it should be appreciated that the flow of water need not be stopped completely to remain within the scope of the present subject matter. For example, safety shutoff valve 108 may be configured for substantially stopping or restricting the flow of water, such as by restricting the flow by greater than 75%. In this regard, safety shutoff valve 108 may be used to restrict the flow any suitable amount for preventing flooding in response to an indication of a fault condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water supply system comprising:
    a hot water heater configured for heating cold water from a water supply and discharging a flow of heated water through a supply conduit;
    a plurality of water consuming appliances, each of the plurality of water consuming appliances being configured for receiving the flow of heated water from the hot water heater through the supply conduit, each of the plurality of water consuming appliances comprising an appliance communication module;
    a safety shutoff valve positioned on the supply conduit downstream from proximate the hot water heater and being in operative communication with the appliance communication module of each of the plurality of water consuming appliances, the safety shutoff valve being configured to stop the flow of heated water when the appliance communication module of one of the plurality of water consuming appliances provides an indication of a fault condition; and
    a plurality of redundant safety shutoff valves, each of the plurality of redundant safety shutoff valves being positioned in series with the safety shutoff valve to fluidly couple one of the plurality of water consuming devices to the hot water heater and being configured to stop the flow of heated water to the one of the plurality of water consuming devices.

2. The water supply system of claim 1, wherein the fault condition is at least one of a leak event, an overflow condition, and a valve stuck in an open position.

3. The water supply system of claim 1, wherein each of the plurality of water consuming appliances includes a fault detection device positioned within the water consuming appliance and being configured for detecting the fault condition of the water consuming appliance.

4. The water supply system of claim 3, wherein the fault detection device is at least one of a flood float, a pressure switch, and a magnetic reed switch.

5. The water supply system of claim 1, wherein the safety shutoff valve comprises a valve communication module in communication with the appliance communication module of each of the plurality of water consuming appliances.

6. The water supply system of claim 5, wherein the appliance communication module of each of the plurality of water consuming appliances and the valve communication module are in wireless communication.

7. The water supply system of claim 1, wherein the hot water heater comprises the safety shutoff valve positioned within the hot water heater.

8. The water supply system of claim 1, wherein the water consuming appliance comprises the safety shutoff valve is positioned within one of the plurality of water consuming appliances.

9. A method of operating a water consuming appliance comprising:
    receiving a flow of water from a water supply;
    determining the existence of a fault condition when the flow of water accumulates within the water consuming appliance beyond a predetermined amount;
    communicating an indication of the fault condition to the water supply from an appliance communication module positioned within or mounted to the water consuming appliance, the water supply being configured to regulate a safety shutoff valve positioned proximate a hot water heater to stop the flow of heated water to the water consuming appliance upon receiving the indication of the fault condition;
    operating a drain cycle to remove the accumulated water within the water consuming appliance;
    regulating the safety shutoff valve to resupply the flow of water to the water consuming appliance;
    communicating the fault condition to the water supply, the water supply being configured to stop the flow of water using the safety shutoff valve; and
    sending an indication that the fault condition is recurring.

10. The method of claim 9, further comprising:
    leaving the safety shutoff valve in the closed position until the fault condition is rectified; and
    sending a restart instruction to the water supply when the fault condition is rectified.

11. The method of claim 9, further comprising sending a notification of the fault condition to a user of the water consuming appliance.

12. A water supply system comprising:
    a hot water heater configured for heating cold water from a water supply and discharging a flow of heated water through a supply conduit;
    a master safety shutoff valve positioned on the supply conduit downstream from the hot water heater;
    a first water consuming appliance configured for receiving the flow of heated water from the hot water heater through the supply conduit, the first water consuming appliance comprising a first appliance communication module;
    a first safety shutoff valve positioned in series with the master safety shutoff valve and fluidly coupling the first water consuming appliance to the supply conduit, the first safety shutoff valve being in operative communication with the first appliance communication module and being configured to stop the flow of heated water to the first water consuming appliance when the first appliance communication module provides an indication of a fault condition;

a second water consuming appliance configured for receiving the flow of heated water from the hot water heater through the supply conduit, the second water consuming appliance comprising a second appliance communication module;

a second safety shutoff valve positioned in series with the master safety shutoff valve and fluidly coupling the second water consuming appliance to the supply conduit, the second safety shutoff valve being in operative communication with the second appliance communication module and being configured to stop the flow of heated water to the second water consuming appliance when the second appliance communication module provides an indication of a fault condition.

13. The water supply system of claim 12, wherein the fault condition is at least one of a leak event, an overflow condition, and a valve stuck in an open position.

14. The water supply system of claim 12, further comprising:

a first fault detection device positioned within the first water consuming appliance and being configured for detecting the fault condition of the first water consuming appliance; and a second fault detection device positioned within the second water consuming appliance and being configured for detecting the fault condition of the second water consuming appliance.

15. The water supply system of claim 14, wherein the first fault detection device and the second fault detection device are at least one of a flood float, a pressure switch, and a magnetic reed switch.

16. The water supply system of claim 12, wherein the first safety shutoff valve comprises a first valve communication module in communication with the first appliance communication module and the second safety shutoff valve comprises a second valve communication module in communication with the second appliance communication module.

17. The water supply system of claim 16, wherein the first appliance communication module and the first valve communication module are in wireless communication and the second appliance communication module and the second valve communication module are in wireless communication.

18. The water supply system of claim 12, wherein the hot water heater comprises a safety shutoff valve positioned within the hot water heater.

* * * * *